US012570182B2

(12) United States Patent
Liu et al.

(10) Patent No.: US 12,570,182 B2
(45) Date of Patent: Mar. 10, 2026

(54) SYSTEM AND METHOD FOR BATTERY ACCUMULATED AGING ESTIMATION

(71) Applicant: DEERE & COMPANY, Moline, IL (US)

(72) Inventors: Yiqi Liu, Raleigh, NC (US); Niannian Tong, Iowa City, IA (US)

(73) Assignee: Deere & Company, Moline, IL (US)

( * ) Notice: Subject to any disclaimer, the term of this patent is extended or adjusted under 35 U.S.C. 154(b) by 677 days.

(21) Appl. No.: 17/830,907

(22) Filed: Jun. 2, 2022

(65) Prior Publication Data

US 2023/0391226 A1     Dec. 7, 2023

(51) Int. Cl.
B60L 58/16          (2019.01)
B60L 58/13          (2019.01)

(52) U.S. Cl.
CPC .............. B60L 58/16 (2019.02); B60L 58/13 (2019.02); *B60L 2240/545* (2013.01); *B60L 2240/662* (2013.01); *B60L 2250/10* (2013.01); *B60L 2250/16* (2013.01); *B60L 2260/52* (2013.01); *B60L 2260/54* (2013.01); *B60L 2260/56* (2013.01)

(58) Field of Classification Search
CPC .... B60L 58/16; B60L 58/13; B60L 2240/545; B60L 2240/662; B60L 2250/10; B60L 2250/16; B60L 2260/52; B60L 2260/54; B60L 2260/56; G01R 31/392; G01R 31/367
See application file for complete search history.

(56) References Cited

U.S. PATENT DOCUMENTS

| | | | |
|---|---|---|---|
| 2017/0115358 A1 | 4/2017 | Kani et al. | |
| 2018/0059192 A1 | 3/2018 | Seo et al. | |
| 2022/0252671 A1* | 8/2022 | Simonis | ................... G07C 5/10 |

FOREIGN PATENT DOCUMENTS

| | | | | |
|---|---|---|---|---|
| CN | 114594391 A | * | 6/2022 | ............. B60L 58/16 |
| DE | 102017103617 A1 | * | 8/2018 | |
| DE | 102021208227 A1 | * | 2/2023 | |

OTHER PUBLICATIONS

DE-102017103617-A1_translated (Year: 2018).*

(Continued)

*Primary Examiner* — Catherine T. Rastovski
*Assistant Examiner* — Michael J. Singletary
(74) *Attorney, Agent, or Firm* — Taft Stettinius & Hollister LLP; Stephen F. Rost

(57)          ABSTRACT

A system and method for estimating an accumulated total battery aging over different aging patterns. A first aging pattern, first aging time, and aging model are used to determine a battery aging estimation. The aging model, battery aging estimation, and a second aging pattern are used to determine an equivalent previous aging time. By adjusting a second aging time based on the equivalent previous aging time, and applying the adjusted second aging time and second aging pattern to the aging model, a battery accumulated aging estimation is determined for the duration of the first and second aging patterns. The process can be repeated for each next aging pattern, with an equivalent previous aging time being determined for each next aging pattern and used with an associated next aging time, aging model, and next aging pattern to determine an accumulated total battery aging estimation.

20 Claims, 6 Drawing Sheets

(56)                  References Cited

OTHER PUBLICATIONS

CN-114594391-A_translated (Year: 2022).*
DE-102021208227-A1_translated (Year: 2023).*
Great Britain Search Report issued in application No. GB2303799.7
dated Aug. 31, 2023 (04 pages).
Schmalstieg, Johannes, et al., "A holistic aging model Li(NiMnCo)O2
based 18650 lithium-ion batteries", Journal of Power Sources, 257
(2014) 325-334; Elsevier, journal homepage: www.elsevier.com/
locate/jpowsour ( pp).

* cited by examiner

200

SYSTEM AND METHOD FOR BATTERY ACCUMULATED AGING ESTIMATION

FIELD OF THE DISCLOSURE

The present disclosure generally relates to systems for estimating battery aging, and, more specifically, to systems for battery accumulated aging estimation under changing aging patterns.

BACKGROUND

Battery aging or degradation can often begin at, or shortly after, the formation of the battery. With respect to at least certain types of batteries, such as, for example, lithium-ion batteries, such aging can be attributed, at least in part, to intrinsic electro-chemical side reactions. As such reactions can occur at both load and rest conditions, these reactions can attribute to both calendar aging and cycle aging.

Two major symptoms of battery aging are battery capacity fade and internal resistance increase. While various aging models can be used to estimate or quantify the effects of battery aging, such models traditionally only deal with fixed aging patterns. Moreover, with respect to calendar aging, such models are often limited to fixed ambient temperature and battery state of charge (SOC). Further, for cycle aging, such models are often limited to a fixed ambient temperature, SOC, and charging and discharging range and rates. However, such fixed aging patterns can lack accuracy, and/or be inapplicable, with respect to at least certain real world conditions.

Accordingly, devices and/or systems to accurately determine battery accumulated aging estimation under changing aging patterns remain areas of interest.

SUMMARY

The present disclosure may comprise one or more of the following features and combinations thereof.

In one embodiment of the present disclosure, a computer implemented method is provided for estimating an accumulated total aging of a battery. The method can include receiving, by a control system having at least one processor, a first aging pattern for the battery and a first aging time. The control system can apply the first aging pattern and the first aging time to an aging model to determine a first battery aging estimation. Further, the aging model can be stored in a memory of the control system. The control system can also receive a second aging pattern for the battery and a second aging time, the second aging pattern being different than the first aging pattern and occurs subsequent to the first aging pattern. Additionally, the control system can use the aging model, the first battery aging estimation, and the second aging pattern to determine an equivalent previous aging time, the equivalent previous aging time providing an adjusted value for the second aging pattern, the adjusted value corresponding to the aging model attaining, under the second aging pattern, the first battery aging estimation. The control system can also adjust the second aging time to account for the equivalent previous aging time, and apply the second aging pattern and the adjusted second aging time to the aging model to determine a battery accumulated aging estimation. The battery accumulated aging estimation can indicate an estimated degradation of the battery over a combined duration of the first and second aging patterns. Further, the control system can transmit to an output device an accumulated total battery aging estimation that is based at least in part on the determined battery accumulated aging estimation.

In another embodiment, a method is provided that can estimate an accumulated total aging of a battery. The method can include a control system having at least one processor receiving an aging pattern and an aging time, the aging pattern can include aging stress factor comprising at least one of a state of charge of the battery, a temperature, a battery charging and/or discharging range, and a battery charging and/or discharging rate. The control system can use the aging pattern, the aging time, and an aging model to determine a battery aging estimation, Further, a next aging pattern and a next aging time can also be received by the control system, the next aging pattern being after, and different than, the aging pattern. Using the aging model, the battery aging estimation, and the next aging pattern, the control system can determine an equivalent previous aging time, the equivalent previous aging time providing an adjusted value for the next aging pattern, the adjusted value corresponding to the aging model attaining, under the next aging pattern, the battery aging estimation. The next aging time can be adjusted by the control system to account for the equivalent previous aging time. Additionally, the control system can apply the next aging pattern and the adjusted next aging time to the aging model to determine a battery accumulated aging estimation, the battery accumulated aging estimation indicating an estimated degradation of the battery over at least a combined duration of the aging pattern and the next aging pattern. Further, for a subsequent aging pattern, the controller can determine an updated equivalent previous aging time using the aging model, the subsequent aging pattern, and the previous battery accumulated aging estimation. The aging time of the subsequent aging pattern can also be adjusted by the control system to account for the updated equivalent previous aging time. The subsequent aging pattern and the adjusted subsequent aging time can be applied by the control system to the aging model to determine an updated battery accumulated aging estimation. Additionally, the method can be repeated for one or more additional subsequent aging patterns, which can include determining an updated equivalent previous aging time for each additional subsequent aging pattern(s) using the aging model, the associated additional subsequent aging pattern, and the updated battery accumulated aging estimation that was previously determined for the preceding subsequent aging pattern. The updated equivalent previous aging time can then be used to modify a time associated with the additional subsequent aging pattern(s), and be used in connection with determining a further updated battery accumulated aging estimation. The updated battery accumulated aging estimation determined using the last of the one or more additional subsequent aging patterns can provide the accumulated total battery aging estimation. The method can also include transmitting, by the control system, the accumulated total battery aging estimation to an output device.

In a further embodiment of the present disclosure, a system is provided for estimating an accumulated total aging of a battery. The system can include an interface for presenting data for a first aging pattern and a second aging pattern, the second aging pattern being different than, and occurs at a time subsequent to, the first aging pattern. The system can also include an aging estimation computing device that can be configured to determine, via applying the first aging pattern and a corresponding first aging time to an aging model, a first battery aging estimation. The aging estimation computing device can further determine, using the aging model, the first battery aging estimation, and the second aging pattern, an equivalent previous aging time, the equivalent previous aging time providing an adjusted value corresponding to the aging model attaining, under the second aging pattern, the first battery aging estimation. The second aging time can be modified by the aging estimation computing device to account for the equivalent previous aging time. Additionally, the aging estimation computing device can determine, by applying the second aging pattern and the modified second aging time to the aging model, an accumulated total battery aging estimation, the accumulated total battery aging estimation indicating an estimated degradation of the battery over a combined duration of the first and second aging patterns. Further, the aging estimation computing device can generate a notification for an output device to convey the accumulated total battery aging estimation.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Corresponding reference numerals are used to indicate corresponding parts throughout the several views.

DETAILED DESCRIPTION

Figure 1:
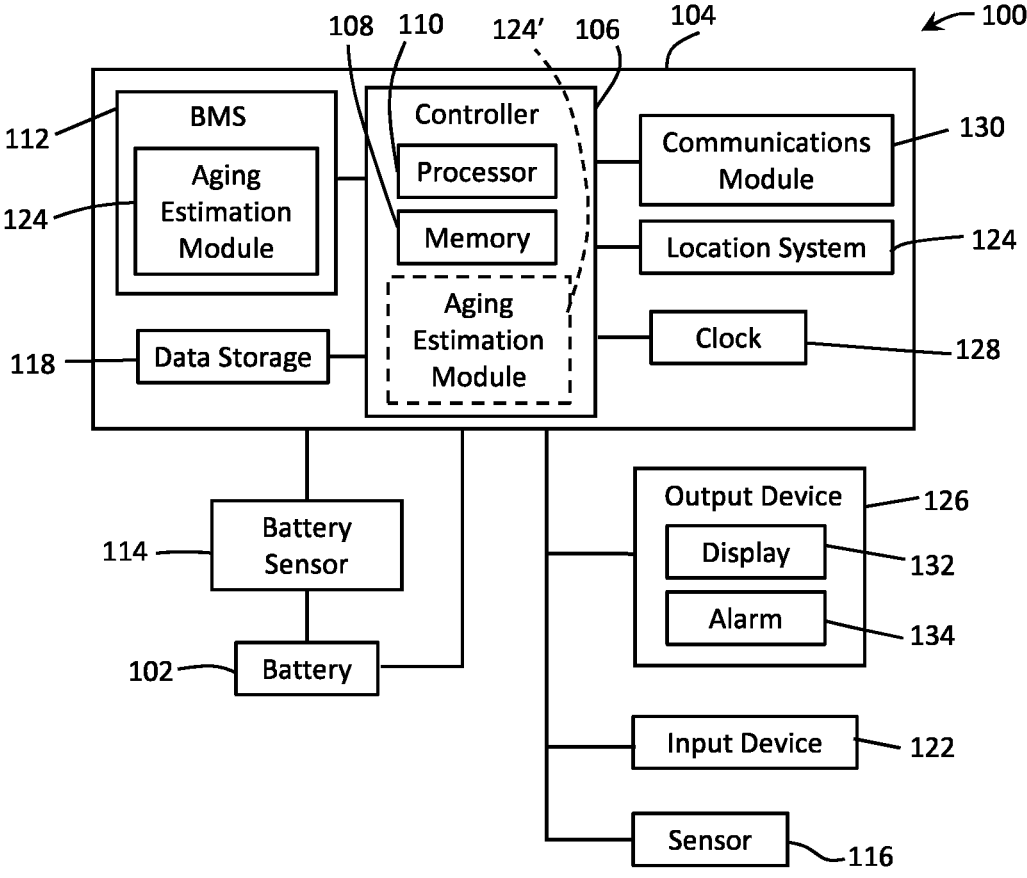
FIG. 1 is a diagrammatic view of an exemplary system with which aspects of the subject technology can be implemented.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

FIG. 1 is a diagrammatic view of an exemplary system 100 with which aspects of the subject technology can be implemented. According to certain embodiments, such as, for example, embodiments in which the system 100 is operated as an online system, the system 100 can be part of a particular device or product having a battery 102, such as, for example, a vehicle, among other types of devices or products. For example, according to certain embodiments, the system 100 can be part of an electrical, or electrically powered, vehicle or electrical hybrid vehicle, including, but not limited to, an electric mower, electric utility vehicle, electric automobile, and/or an electric agricultural vehicle, among other types of vehicles. For example, according to certain embodiments, the vehicle can be a zero-turn mower, stand-on mower, walk-behind mower, front and/or wide area mower, utility vehicle, compact tractor, utility tractor, specialty tractor, large tractor, row crop tractor, combine harvester, excavator, dump truck, backhoe, crawler loader, dozer, motor grader, wheel loader, and tractor loader, among other types of at least partially electrically powered vehicles. Additionally, according to certain embodiments, the system 100 can be part of a tool or implement, such as, for example, electric backhoe and/or an electric sprayer, among other tools and devices. Further, according to other embodiments, the system 100 can be a design, testing, or measuring system or unit that may or may not be incorporated into another device or product.

As seen in FIG. 1, the system 100 can include a control system 104. According to certain embodiments, the control system 104 can be coupled to, and mounted, on a vehicle, product, or device. The control system 104 includes a controller 106 that has a memory 108 having instructions stored therein that are executable by a processor 110 to cause the processor 110 to receive input, such as, for example, from at least a battery management system (BMS) 112, battery sensor 114, battery 102, stress factor senor 116, data storage 118, clock 120, input device 122, and/or an aging estimation module or computing device 124, and can output a signal to at least an output device 126, the aging estimation computing device 124, the BMS 112, and/or a communication module 130.

The processor 110 of the illustrative controller 106 can be embodied as, or otherwise include, any type of processor, controller, or other compute circuit capable of performing various tasks such as compute functions and/or controlling the functions of the system 100. For example, the processor 110 may be embodied as a single or multi-core processor(s), a microcontroller, or other processor or processing/controlling circuit. In some embodiments, the processor 110 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 110 may be embodied as, or otherwise include, a high-power processor, an accelerator co-processor, or a storage controller. In some embodiments still, the processor 110 may include more than one processor, controller, or compute circuit.

The memory 108 of the illustrative controller 106 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory 108 may be embodied as a block addressable memory, such as those based on NAND or NOR technologies. The memory 108 may also include future generation nonvolatile devices, such as a three dimensional crosspoint memory device (e.g., Intel 3D XPoint™ memory), or other byte addressable write-in-place nonvolatile memory devices. In some embodiments, the memory 108 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

A variety of different types of batteries can be used as the battery 102 of the system 100, including rechargeable and non-rechargeable batteries. For example, according to certain embodiments, the battery 102 can be a lithium-ion battery. However, other types of batteries can be utilized as the battery 102, including, but not limited to, alkaline, carbon zinc, silver oxide, zinc air, nickel cadmium (NiCd), and nickel-metal hydride (NiMH), among others, can be utilized. As seen in FIG. 1, according to certain embodiments, the battery 102 can be electrically coupled to the control system 104, or, alternatively, be part of the control system 104. Further, according to at least certain embodiments, the battery 102 can electrically power at least the control system 104 of the system 100.

The aging estimation computing device 124 can be embodied as hardware, firmware, software, virtualized hardware, emulated architecture, and/or a combination thereof, and is configured to provide or calculate an estimated accumulated age for the battery 102. To do so, in the illustrative embodiment, the aging estimation computing device 124 may perform the method 200 described below with reference to FIG. 2. Moreover, the age estimation computing device 124 can include one or more aging models that can be utilized in estimating an accumulated degradation of the battery 102, even in the event the battery is anticipated to be subjected to, and/or experiences, different aging patterns, including changes in one or more aging stress factors that can attribute to either battery calendar aging and/or battery cycle aging.

The BMS 112, which can, for example, be embodied as hardware, firmware, software, virtualized hardware, emulated architecture, and/or a combination thereof, can be configured to control and/or monitor at least the operation and/or condition of the battery 102. For example, as discussed below, according to certain embodiments, the BMS 112 can be used to at least periodically monitor and/or measure the capacity of the battery 102, interrupt and/or reduce peak current output, manage the supply of electrical power from/to the battery 102, manage the temperature of the battery, preform diagnosis of the battery, and/or monitor the health of the battery 102, among other features and capabilities of the BMS 112. Accordingly, the BMS 112 can utilize information provided from one or more battery sensors 114 that can be coupled to the battery 102. Such a sensor(s) 114 can be configured to provide a variety of information regarding the status, condition, and/or operation of the battery 102, including, for example, information regarding current drawn from, or supplied to, the battery 102, as well as voltage levels of the battery 102, among other information.

With respect to at least an on-line system, such as, for example, the system 100 that is illustrated in FIG. 1, the aging estimation computing device 124 can be implemented in, or as a part of, the BMS 112. For example, according to certain embodiments, the aging estimation computing device 124 can be implemented in a microcontroller of the BMS 112. Alternatively, as indicated by the broken line format for the aging estimation computing device 124' shown in FIG. 1, according to other embodiments, the aging estimation computing device 124' can be part of a controller 106, such as, for example, a vehicle control unit (VCU), among other types of controllers.

According to certain embodiments, the aging estimation computing device 124 can use information obtained, and/or calculated, by the BMS 112 or controller 106 in connection with estimating an accumulated degradation for the battery 102. Additionally, or alternatively, the aging estimation computing device 124 can use information from one or more stress factor sensors 116 of the system 100. Moreover, the stress factor senor 116 can provide information regarding one or more aging stress factors, as discussed below, that can at least contribute to the degradation of the battery 102. For example, according to certain embodiments, the one or more stress factor sensors 116 can include a temperature sensor that can provide information regarding the ambient temperatures to which the battery 102 has been, and/or is being, exposed. Such information can provide an indication of the characteristics and/or a duration of an aging pattern(s), as well as information regarding any changes that indicate an occurrence of another, or subsequent, aging pattern(s).

While monitoring an aging pattern, and/or upon detection of another aging pattern, the aging estimation computing device 124 can utilize the clock or timer 120 to monitor or count a time or duration associated with each aging pattern. Additionally, as discussed below in more detail, in addition to monitoring one or more conditions associated with an aging pattern(s), the aging estimation computing device 124 can also be configured to determine, and update, an accumulated total aging for the battery 102. According to certain embodiments, the aging estimation computing device 124 can also evaluate the accumulate total aging determination that is determined, and/or that is updated, using the aging estimation computing device 124. Such evaluations can, for example, involve the aging estimation computing device 124 comparing the calculated, and/or updated, accumulate total aging determination with a threshold value. Further, in the event such a comparison indicates that the calculated, and/or updated, accumulate total aging determination does not satisfy the threshold value, the aging estimation computing device 124 can be used in the generation of a signal to activate the output device 126 in a manner that can provide an alert to an operator.

According to certain embodiments, the controller 106 can utilize information from a location system 128, such as, for example, a global positioning system, in connection with providing a location of at least the battery 102. Information regarding the location of the battery 102 can indicate which battery 102 may, based at least on information provided by the aging estimation computing device 124, may need replacement, charging, or other action that may extend the longevity, or improve the condition, of the battery 102. The location of the battery 102 however can be determined in a variety of different manners, including, for example, via use of passive or active radio frequency identification.

The control system 104 can further include a communications module 130 that can communicate information from the control system 104 to other devices and/or databases.

The communications module 130 can be embodied as hardware, firmware, software, virtualized hardware, emulated architecture, and/or a combination thereof as discussed above. According to certain embodiments, the communications module 130 can comprise a transceiver that is configured to wirelessly communicate information, as well as receive information, that may pertain to, or assist, the aging estimation computing device 124 in determining an aging estimation for the battery 102.

The system 100 can also include an input device 122, including, but not limited to, as user input device, such as, for example, a keyboard, touch screen, mouse, and/or scanning device, among other input devices. The input device 122 can allow an operator to input information or data into the system 100 that can be utilized by the controller 106 and/or aging estimation computing device 124 in either developing an aging model(s) and/or deriving an estimated battery degradation using an aging model(s). For example, the user can input information such as test data, including for example, the test data represented by Table 1 below, in connection with developing one or more aging models. Additionally, or alternatively, the input device 122 can be used to input information to the control system 104 regarding actual and/or hypothetical aging patterns and/or aging stress factors, such as, for example, ambient temperature(s), state of charge (SOC) of the battery 102, and/or time, that can impact aging estimation that is provided by the aging estimation computing device 124.

The system 100 can further include one or more output devices 126, such as, for example, a display 132 and/or an alarm 134. The display 132 can provide visual information to the operator, including the results of a battery degradation determination based on calendar aging and/or cycle aging that is determined by the aging estimation computing device 124 via use of one or more aging models. The display 132 can also include information obtained by the BMS 112, including information that is actually sensed or measured, or that is derived using actual measurements, that can be utilized for at least purposes of comparison with the information obtained via the aging estimation computing device 124. For example, according to certain embodiments, the aging estimation computing device 124 can provide an estimation for battery capacity and/or battery capacity fade that can be compared with corresponding information that may obtained via an actual ampere hour rating for the battery 102 that is obtained by the BMS 112 from measured or sensed information.

Figure 2:
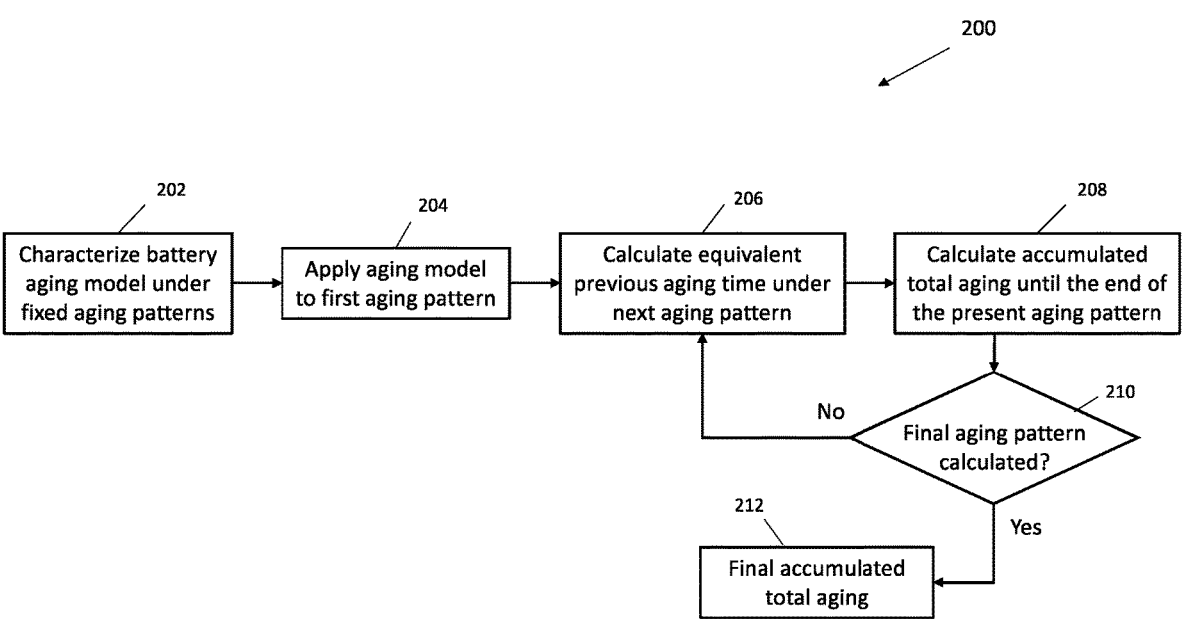
FIG. 2 is a simplified flowchart of a method for estimating an accumulated total aging that can be performed at least by the system diagrammatically depicted in FIG. 1.

The alarm 134 can be adapted to provide a visual and/or audible alert to an operator. Such an alert can be triggered in a variety of different manners. For instance, an alert can be provided by the alarm 134 in the event the battery degradation determination aging estimation computing device 124 satisfies, including, for example, falls below or is under, a predetermined threshold. For instance, in response to a change in an aging pattern, such as, for example, an increase or decrease in an ambient temperature at a battery 102 location, the controller 106 can be configured to trigger operation of the aging estimation computing device 124 to estimate the effect such a change can have on a battery accumulated degradation, as may be estimated via the below-discussed method 200 that is illustrated in FIG. 2. If the resulting estimated battery degradation satisfies a predetermined condition or threshold, such as, for example, results in the estimated battery degradation being below a certain threshold, the alarm 134 can be activated to notify the operator of the change, and/or provide an indication that the operator may wish to take a remedial action to prevent and/or minimize such anticipated degradation. For example, such an alarm can indicate to the operator that a change in the temperature at which the battery 112 is, or will be, stored may warrant at least consideration, if not warrant changing such a temperature.

While FIG. 1 illustrates an exemplary embodiment in which the aging estimation device 124 is part of an online system 100, according to other embodiments, the aging estimation device 124 can be part of an offline system. For example, according to certain embodiments, the aging estimation device 124 can be part of a workstation and/or a design or analysis device or system. In such offline embodiments, the aging estimation device 124 can be embodied as hardware, firmware, software, virtualized hardware, emulated architecture, and/or a combination thereof. Additionally, when operated at least offline, the aging estimation device 124 can utilize historical, theoretical, and/or predicated information, including, for example, temperature data, to estimate accumulate total aging determination. For example, when utilized at least as part of an offline system, the aging estimation device 124 can provide a relatively accurate manner of estimating the impact(s) storage of the battery 102 at various temperatures and/or for various time durations under certain conditions may have on battery degradation. Such determinations can at least assist in determining storage plans for batteries 102, including storage plans during different seasonal and/or ambient conditions. For example, such determinations can assist in determining the impact the presence, operation, and/or duration of operation of a heating, ventilation, and air conditioning (HVAC) unit(s) may have on minimizing degradation of the battery 102.

FIG. 2 is a simplified flowchart of a method 200 for estimating an accumulated total aging for a device, such as, for example, a battery 102, that can be performed by the aging estimation computing device 124 of the control system 104 that is diagrammatically depicted in FIG. 1. The method 200 corresponds to, or is otherwise associated with, performance of the blocks described below in the illustrative sequence of FIG. 2. It should be appreciated, however, that the method 200 can be performed in one or more sequences different from the illustrative sequence.

According to certain embodiments, at block 202, one or more aging models can be developed. The aging model(s) that is developed can be directed to one or more aging stress factors, either individually or in various combinations, that can impact calendar aging and/or cycle aging of the battery 102. For example, according to certain embodiments, aging stress factors such as ambient temperature(s), SOC, and/or time, among others, can be selected for studying the impact that such a selected aging stress factor(s) has on aging rate, also referred to herein as degradation. Further, such studies can utilize variations and/or combinations of values associated with the selected aging stress factor(s) in connection with developing, from the results of such studies, various aging patterns. Such a process is at least sometimes referred to as the design of experiments.

Accordingly, at block 202 one or more batteries 112 can be subjected to intentional aging to study the impact selected aging stress factors, and/or combinations thereof, have on aging rate. Using data and information gained by such intentional aging of the battery 102, relationships between the selected aging stress factors and aging rates can be modeled, such as, for example, via curve fitting of characterization data.

For example, one possible model can indicate the impact different ambient temperatures have on battery capacity fade. Such a model can, for example, be based on studies in which different batteries 102 are each subjected to one of a plurality of different predetermined temperatures, and the capacity fade of those batteries 102 can be measured at predetermined time periods or intervals while the batteries 102 are being subjected to the selected ambient temperature. Further, in at least some studies, while certain aging stress factors may be varied, other aging stress factors may remain constant. For example, in the preceding example, while various, different ambient temperatures may be used, other aging stress factors, such as, for example, SOC, can be held, or assumed to be, constant.

The below table illustrates an exemplary study in which battery capacity fade is studied or evaluated at four 60 day intervals for ambient temperatures of 25 degrees Celsius (° C.), 35° C., and 45° C. Table 1 below provides an indication of the type of information that could be attained from such a study, and in which the test results correspond to capacity fade (Q). For purposes of illustration, entries for capacity fade obtainable from such a study are generically represented below in Table 1 in a two digit format, the first digit being representative of the associated temperature selection (e.g., Q1x being associated with 25° C., Q2x being associated with 35° C., and Q3x being associated with 45° C.) and the second digit corresponds to the time interval (e.g., Qx1 being associated with 60 days, Qx2 being associated with 120 days, etc.). In such a study, an actual determined or measured capacity fade obtained from the testing of the batteries 102 can be provided in a table similar to Table 1 as a unit of relative percentage.

TABLE 1

| SOC condition | Temp. condition | Capacity fade after 60 days | Capacity fade after 120 days | Capacity fade after 180 days | Capacity fade after 240 days |
|---|---|---|---|---|---|
| 100% | 25° C. | Q11 | Q12 | Q13 | Q14 |
| | 35° C. | Q21 | Q22 | Q23 | Q24 |
| | 45° C. | Q31 | Q32 | Q33 | Q34 |

In this example, the information or data obtained from such testing can be used to determine a relationship between temperature and capacity fade. Determining such a relationship can be achieved in a variety of different manners, including, for example, via curve fitting. More specifically, in the illustrated embodiment, for each of the predetermined temperatures (25° C., 35° C., and 45° C.), curve fitting can be used with the measured or determined capacity fade data to develop a relationship between temperature and battery capacity fade. For example, with respect to the first temperature (25° C.) and associated capacity fade results (Q11, Q12, Q13), a calendar aging equation can be curved fit using an Arrhenius relationship, as shown in below Equation 1:

$$Q_{rel} = A \cdot \exp\left(-\frac{E_a}{R \cdot T}\right) \cdot t^z \qquad \text{(Equation 1)}$$

where $E_a$ is an unknown, but constant, activation energy; R is a known gas constant; T is absolute temperature; t is time; z is a power factor for time; $Q_{rel}$ is capacity fade as a unit of relative percentage; and, A is an aging factor that is related to SOC. As SOC in this particular example is constant, the aging factor (A) in this example can also be a constant. Similar curve fitting can also be performed using data from other temperatures, such as, for example, the capacity fade results (Q21, Q22, Q23, Q24) associated with the second temperature (35° C.), and the capacity fade results (Q31, Q32, Q33, Q34) associated with the third temperature (45° C.).

Figure 3:
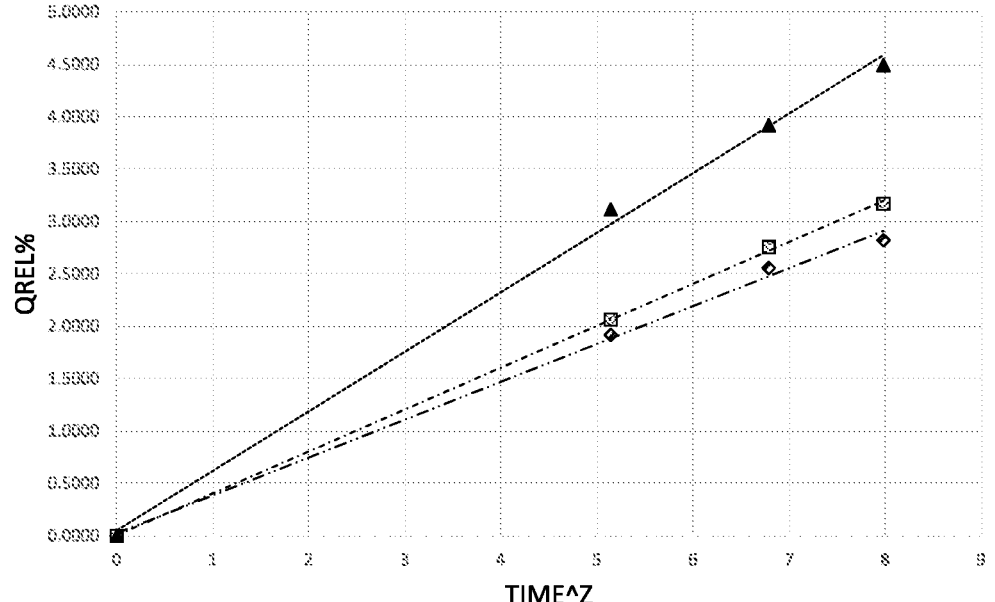
FIG. 3 illustrates an exemplary graph for measured capacity fade as a function of time for a plurality of temperatures.

The curve fitting attained using Equation 1 can involve two steps. In the first step, information from Table 1, namely the measured capacity fade, can be graphed as a function of time for each temperature, as illustrated, for example, in FIG. 3. Linear curves from such graphing can be used in characterizing the power factor (z) for time. Then, in a second step, above Equation 1 can be rearranged as shown below in Equation 2:

$$Ln(Q_{rel}) = -\frac{E_a}{R} \cdot \frac{1}{T} + Ln(A) + z \cdot L_n(t)$$ (Equation 2)

Figure 4:
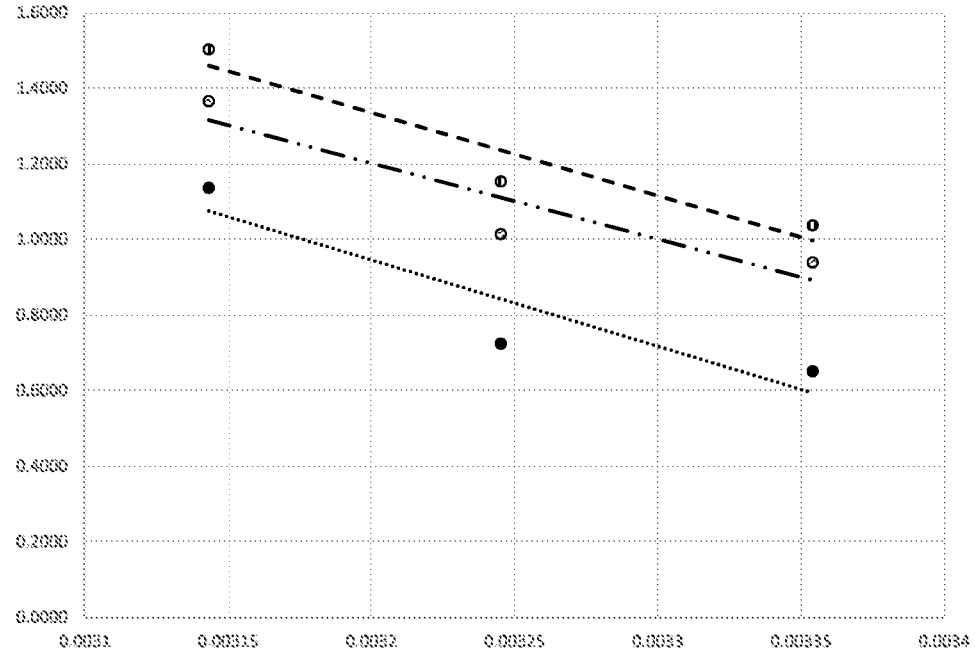
FIG. 4 illustrates a plot of a natural logarithm of capacity fade as an inverse function of temperature for a certain aging time.

Equation 2 can be used to plot the natural logarithm of capacity fade ($Ln(Q_{rel})$) as a function of 1/T for a certain aging time (t), as illustrated, for example, in FIG. 4. In FIG. 4, the $Ln(Q_{rel})$ is along the Y-axis, and 1/T is along the X-axis. Often, the longest time, such as, for example, data associated with 240 days in above exemplary Table 1, is selected for the aging time. A curve generated by the plot can be used to characterize the activation energy ($E_a$). Additionally, the intersection of the curve with the Y-axis ($Ln(Q_{rel})$) can be used to characterize the aging factor (A), as the power factor (z) was previously determined, discussed with respect to the first step, and thus is known.

With characterizations developed for activation energy ($E_a$), aging factor (A), and power factor (z), and with the gas constant (R) being known, Equation 1 can provide a model for determining or estimating capacity fade over periods of time that can be experienced when the battery 102 is exposed to different aging patterns in the form of different ambient temperatures.

As indicated above, in the illustrated embodiment, a model is generated that addresses the impact ambient temperatures have on capacity fade, with activation energy ($E_a$), aging factor (A), and power factor (z) being characterized, and other aging stress factors, such as, for example, SOC, being held constant. However, other models can be based on other aging stress factors, which can result in one or more other aging stress factors and/or variables being held constant or being characterized. Additionally, while the foregoing discusses a particular process for developing models, other processes and/or models can be used at block 202.

At block 204, the aging model can be applied to a first aging pattern to determine a first battery aging estimation. For example, according to certain embodiments, the aging model applied at block 204 can be the particular model discussed above with respect to block 202, and more particularly, the aging model that utilized Equation 1. Additionally, or alternatively, another aging model, including a pre-existing model, can be utilized at block 204. Further, the actual aging model used at block 204 can be based on an aging pattern(s) and/or aging stress factor(s) that is different than those discussed above with respect to Equation 1.

Using the aging model and a first aging pattern, an estimation for the particular aging characteristic(s) during that first aging pattern can be determined. Thus, for at least purposes of discussion, with respect to the aging model provided by Equation 1, and the associated characterizations and constants, Equation 1 can be utilized to provide a first battery aging estimation in the form of an estimated first capacity fade ($Q_{rel1}$) for an exemplary first aging pattern, such as, for example exposure of the battery 102 to aging pattern of an ambient temperature of 25° C. for a first time ($t_1$), such as, for example, 60 days. Such an aging pattern, as well as the associated time, can be theoretical, or, alternatively, can correspond to an actual exposure of the battery 102 to such an aging pattern. For example, according to certain embodiments in which the temperature and time are aging stress factors that are inputted into the aging model, such inputs can be based on an anticipated exposure of the battery 102. Such anticipated exposure can be based, for example, on historical aging patterns, such as, for example, aging patterns that have in the past, or traditionally, been encountered by the battery 102 at particular geographical locations and/or during different seasons. Alternatively, information regarding the first aging pattern can be based on information from the stress sensor 116, and the corresponding times or time of exposure to such conditions, as may be provided via a timer or clock 120 of the control system 104. Further, according to certain embodiments, information regarding an aging pattern can be continuously collected, such as, for example, via operation of the stress sensor 116 and timer or clock 120, during the duration of the aging pattern.

At times however, the battery 102 can be exposed to different aging patterns. For instance, while the example discussed above in block 204 involves a first aging pattern in which the battery 102 is exposed to a first ambient temperature of 25° C. for first time ($t_1$) of 60 days, the battery 102 can subsequently be exposed to a second, or next, aging pattern, such as, for example a different ambient temperature for another, or second, time ($t_2$). For example, in the discussed example, following a first aging pattern comprising exposure to an ambient temperature of 25° C. for a first time ($t_1$) of 60 days, the battery 102 could subsequently be exposed to a second, or next, aging pattern, comprising exposure of the battery 102 to a second, higher ambient temperature of 35° C. for second time period ($t_2$) of 30 days. In such a situation in which the aging pattern changes, the second capacity fade ($Q_{rel2}$) for the second aging pattern (e.g., exposure to an ambient temperature of 35° C.) during the second time ($t_2$) (e.g., 30 days) can again be estimated using, for example, Equation 1, among other models, with the associated characterizations and constants, as discussed above.

However, aging models, including the above-discussed model from Equation 1, can be a non-linear function of time. Thus, in the illustrated example, the accumulated degradation of the battery 102, such as, for example, the total accumulated capacity fade over both the first and second times ($t_1$, $t_2$) under different first and second aging patterns may not be accurately determined or estimated based on a cumulative sum of the first and second capacity fade estimations ($Q_{rel1}$, $Q_{rel2}$). Thus, in the above example, the estimated total capacity fade over a combined first and second times (e.g., $t_1+t_2$), or, in this example, 90 days ($t_1$ period of 30 days+$t_2$ period of 60 days) involving different aging patterns (25° C. and 35° C. ambient temperatures) may not be the cumulative sum of the first capacity fade ($Q_{rel1}$) and the second capacity fade ($Q_{rel2}$) (e.g., accumulated total capacity fade ($Q_{relT}$) during different aging patterns may not be equal to $Q_{rel1}+Q_{rel2}$). Attempting to estimate the accumulated capacity fade ($Q_{relT}$) in such a cumulative manner can thus result in inaccurate determinations, and corresponding inaccuracies in the estimation of the remaining battery capacity after such time periods.

Accordingly, at block 206, the method 200 further includes calculating an equivalent previous aging time under a next aging pattern. The equivalent previous aging time can provide an indication of an equivalency of degradation of the battery 102 under a different aging pattern. Moreover, such an equivalency can represent an amount or degree a prior degradation can be factored into, or supplement, a subsequent degradation estimation that is based on the next aging pattern so as to obtain an estimation for the accumulated total aging or degradation of the battery 102. Moreover, by factoring the prior degradation, via the equivalent previous aging time, into the subsequent degradation estimation, the subsequent degradation estimation can provide a relatively accurate estimation of a accumulated total degradation, and, moreover, an accumulated degradation of the battery 102 over one or more prior aging patterns and a next or subsequent aging pattern.

For example, as discussed below, according to certain embodiments, the equivalent previous aging stress factor can be an equivalent previous aging time. An equivalent previous aging time can provide an indication of an equivalent amount of time ($dt_2$) needed under a second, or next aging pattern before degradation of the battery 102 reaches a level that was, or will be, attained during a prior, or first time ($t_1$) under a different, first aging pattern. By considering the equivalent amount of time ($dt_2$) with the second time ($t_2$) of the second, or next, aging pattern, the calculated degradation under the second aging pattern will represent an accumulated degradation that is a result of the first and second aging patterns and the associated first and second times ($t_1$ and $t_2$).

Determining which aging stress factor is to provide the equivalent previous aging stress factor can be based on a variety of factors, such as, for example, the model being used, the stress factor(s) being evaluated, and/or the type of aging pattern. Thus, the previous equivalent aging stress factor to be determined at block 206 can be an equivalent for one or more aging stress factors such as, for example, time.

As an example, the above discussion regarding block 202 provides an exemplary illustration in which the model provided by Equation 1 and the associated characterizations were developed using different aging patterns, and more specifically, different ambient temperatures (e.g., 25° C., 35° C., 45° C.), while the SOC was held as a constant. Thus, in this example, the age stress factor of time (t) can be considered a variable. Accordingly, in such a situation, the aging stress factor of time can be utilized for purposes of determining the equivalent previous aging stress factor. Further, in such a situation, changes in ambient temperature can be considered to constitute a change in aging pattern. However, according to other embodiments, other aging stress factors can be utilized as the change in aging pattern, and/or other aging stress factors can be utilized for purposes of determining the equivalent previous aging stress factor.

Calculating the equivalent previous aging time can involve reusing the aging model and associated characterizations and constants that were used in block 204, but changing one or more aging stress factors to reflect the next, or other, aging pattern. Further, the degradation result obtained in block 204, which in the illustrated example was the first capacity fade ($Q_{rel}$), is utilized in Equation 1 in connection with calculating the equivalent previous aging time. As result, using the previously determined value for the first capacity fade ($Q_{rel1}$), and the next aging pattern (e.g., an absolute temperature based on the second ambient temperature of 35° C.), as well as the previously known characterizations and constants, the aging model provided by Equation 1 can be rearranged and solved to provide a value for the unknown equivalent previous aging time. Thus, in the illustrated example, at block 206, the aging model of Equation 1 can, be arranged to calculate a time (t), which in this instance, will be the equivalent previous aging time ($dt_2$).

By solving for time (t), and moreover the equivalent previous aging time ($dt_2$), an estimate as to the equivalent time ($dt_2$) is obtained that indicates the time needed, under the second aging pattern, to attain the same level of capacity fade ($Q_{rel1}$) that was estimated to have occurred during the first aging pattern (e.g. under the first aging pattern during the first time ($t_1$)). Thus, for example, if a battery 102 is determined by the aging model to have a first capacity fade value ($Q_{rel1}$) after 60 days under a first aging pattern comprising an ambient temperature of 25° C., the equivalent previous aging time ($dt_2$) would indicate the period of time it would take for the battery 102 to attain the same capacity fade ($Q_{rel1}$) under a second aging pattern comprising an ambient temperature of 35° C.

At block 208, the equivalent previous aging time is taken into account with respect to, and/or factored into, the associated or corresponding aging stress factors of the second aging pattern. For example, the equivalent previous aging time can indicate an amount or degree that the corresponding aging stress factor of the second aging pattern is to be increased so as to also account for the impact the first aging pattern had on degradation. For example, according to certain embodiments, the second time ($t_2$) of the second, or next, aging pattern can be increased by the addition of the equivalent previous aging time ($dt_2$). Thus, in such an embodiment in which Equation 1 provides the aging model, the time (t) can be the sum of the second time ($t_2$) associated with the second aging pattern, and the equivalent previous aging time ($dt_2$) that accounts for degradation during the first aging pattern (e.g., $t = t_2 + dt_2$). The absolute temperature (T) can still be based on the second, or next aging pattern, which in this example corresponds to an ambient temperature of 35° C. By adjusting the time of the second aging pattern to include the equivalent previous aging time associated with the first aging pattern, the aging model (Equation 1) can, at block 208, calculate an estimated accumulated capacity fade ($Qrel_{1-2}$) that covers both the first and second aging patterns for the first and second times.

At block 210, a determination can be made as to whether additional aging patterns are to be considered. If not, then at block 212, the final accumulated total aging estimation can be determined. Such a determination at block 212 can also be accompanied by the control system 104 transmitting, or otherwise communicating, the final accumulated total aging estimation to the output device 126, such as, for example, via a wired or wireless connection with the display 132.

In the above example, if the two prior aging patterns that are directed to capacity fade are the only aging patterns, then the final accumulated total aging ($Qrel_T$) which can be the accumulated capacity fade ($Qrel_{1-2}$) that was determined at block 208.

If however at block 210 a determination is made that one or more subsequent aging patterns are to be considered, such as, for example, a third aging pattern that is different than the preceding second aging pattern, then the method 200 can return to block 206.

By returning to block 206, another equivalent previous aging time can be determined to account for the degradation that occurred over the first and second aging periods. Thus, for example, following the prior examples in which the aging model (Equation 1) relates to capacity fade, and the different aging pattern is a change in ambient temperature (e.g., a third ambient temperature of 45° C.), the aging model can be rearranged to calculate a degradation time $(dt_3)$. Further, as previously mentioned, characterizations are known for activation energy $(E_a)$, aging factor $(A)$, and power factor $(z)$, and the gas constant $(R)$ is also known. By entering the previously determined estimation for accumulated capacity fade $(Qrel_{1-2})$ that occurred over the first and second aging patterns, and the next aging pattern (e.g., an absolute temperature $(T)$ corresponding to an ambient temperature of 45° C.), a time $(t)$, which is the updated equivalent previous aging time $(dt_3)$, can be determined.

Again, this additional equivalent previous aging time $(dt_3)$ can influence the estimation provided by the aging model (Equation 1) for the third aging pattern such that the estimated degradation can provide a total accumulated degradation over each of the first, second, and third aging patterns. Accordingly, at block 208, according to the illustrated example, using the third aging pattern, the time $(t)$ for the aging model (Equation 1) is the sum of the third time $(t_3)$ of the third aging pattern and the additional equivalent previous aging time $(dt_3)$ that was calculated at block 206 (e.g., $t=t_3+dt_3$). By using this cumulative time $(t)$ with the next, or third, aging pattern (e.g., ambient temperature of 45 C.°, the aging model (Equation 1) can provide an estimation for the accumulated total capacity fade $(Qrel_{1-3})$ that extends over, the first, second and third aging patterns.

If at the block 210 a determination is made that the third aging pattern is the final aging pattern, than at block 212 the determination previously made at block 208, namely the accumulated capacity fade $(Qrel_{1-3})$, can be the final accumulated total capacity fade $(Qrel_T)$. Otherwise, the method can return to block 206, and another equivalent previous aging time can be determined for a fourth aging pattern, and another accumulated total capacity fade estimation can be determined at block 208. Such a process can continue until a determination is made at block 210 that the final aging pattern has been considered, and/or after a predetermined number of aging patterns have been considered, upon which the final accumulated total aging can be identified at block 212.

Optionally, or alternatively, following block 212, the method can also include testing the battery 102 to confirm the estimation obtained at block 212. For example, in the illustrated embodiment, following block 212, one or more measurements similar to the measurements used to obtain the capacity fade data in Table 1 can be performed. Such testing can be performed at a variety of different manners. For example, according to certain embodiments, in which the method 200 is being utilized to estimate battery capacity, or capacity fade, a battery capacity test can be performed in which an amount of electricity extracted from the battery 102 is measured over a period of time to determine an ampere-hour rating for the battery 102. Such testing can be performed in a variety of different settings, including, for example, on or by a vehicle or other device that uses the battery 102 and/or via bench testing, among other manners of testing.

The method 200 provides a process for estimating accumulated device aging involving a plurality of aging patterns, and can be utilized with aging models associated with calendar aging or cycle aging. Additionally, the method 200 can be used for a variety of different types of batteries, and can assist in the management, storage, planning, and/or design of batteries 102.

For example, the method 200 can assist in planning with respect to the purchase or inventory of replacement batteries, and/or planning battery charging cycles. Additionally, estimations obtainable from the method 200 can assist in managing certain aging stress factors, such as, for example, planning the ambient temperature(s) to which the associated device will be exposed, including, for example, during shipping and/or storage, so as to maximize the longevity of the battery 102. Similarly, such a method can assist in determining storage conditions for the battery 102, which can assist in attaining a balance between storing and/or maintaining the battery 102 within certain temperatures that can maximize the longevity of the battery 102, and the associated costs for such storage, including the heating and/or air conditioning costs associated with such temperatures. Such a method 200 can also apply to estimating a longevity of a battery 102 when exposed to anticipated levels or degrees of aging stress factors, which can assist in determining a length of an associated warranty for the battery 102 and/or associated service plans, as well as assist in the development of safety protocols relating to the potential degradation of the battery 102.

Figure 5:
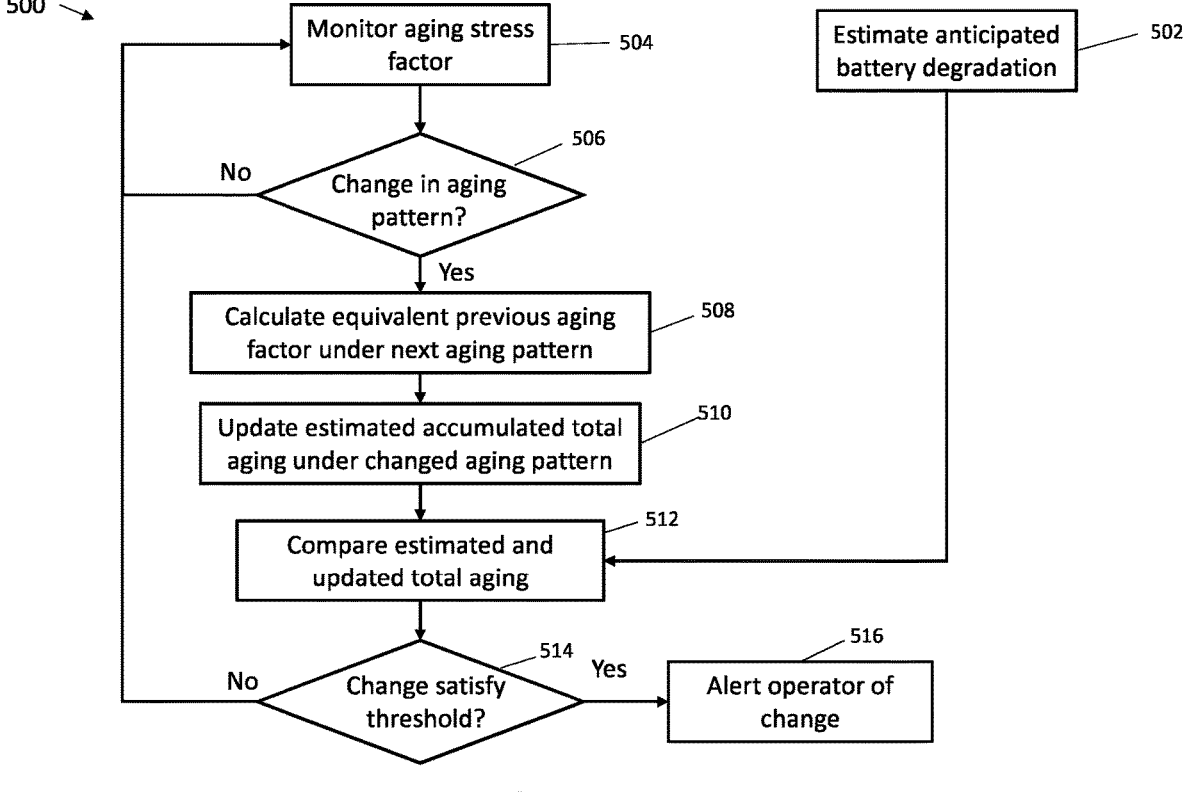
FIG. 5 is a simplified flowchart of a method for detecting changes in an aging pattern that can cause a deviation from an estimated accumulated total aging for a battery that can be performed by at least the system diagrammatically depicted in FIG. 1.

The method 200 can be utilized in a variety of different manners, including, but not limited to, in connection with use of the aging estimation computing device 124 in both offline and online systems, as discussed above, Additionally, the method 200 can also be used in connection with providing at least a baseline of anticipated battery degradation under anticipated conditions and/or environments. In the event a deviation(s) from an anticipated condition(s) occurs, among other types of trigger conditions, the impact such deviations have, or will be estimated to have, on battery degradation can be compared to the baseline estimation that can be attained by the method 200. Such a comparison can provide an indication as to whether the deviation warrants issuing an alter to an operator of such deviations and/or whether to consider taking a corrective action. For example, FIG. 5 is a simplified flowchart of a method 500 that can be performed by the aging estimation computing device 124 of the control system 104, and that can incorporate the method 200 of FIG. 2 for estimating accumulated total battery degradation. The method 500 corresponds to, or is otherwise associated with, performance of the blocks described below in the illustrative sequence of FIG. 5. It should be appreciated, however, that the method 500 can be performed in one or more sequences different from the illustrative sequence.

At block 502, the estimated anticipated battery degradation can be determined. Such a determination can involve the method 200 discussed above with respect to FIG. 2. Thus, according to certain embodiments, the estimated anticipated battery degradation at block 502 can be the final accumulated total degradation that was determined at block 212 in FIG. 2. Additionally, the estimated anticipated battery degradation from block 502 and/or the final accumulated total degradation that was determined at block 212 can be stored by the control system 104, including, for example in the memory 108 and/or a data storage unit 118.

Additionally, at block 504, one or more aging stress factors can be monitored. Such monitoring can occur in a variety of a different manners, including, for example, by use of the stress sensor 116, battery sensor 114, and/or BMS 112. Further, the monitored aging stress factor can correspond to a sensed or measured value, or can be the result of a calculation. For example, according to start embodiments, the aging stress factor being monitored at block 504 can be the temperature of the ambient environment in which the battery 102 is located, as detected by the stress sensor 116.

As previously discussed with respect to method 200 of FIG. 2, the final accumulated total degradation that was determined at block 212, and thus the estimated anticipated battery degradation that can be used for block 502, can be based on anticipated aging patterns, including, for example, aging patterns that are based on anticipated temperatures and/or temperature ranges. However, during actual use, the battery 102 can experience one or more deviations from such anticipated aging patterns that can cause greater than anticipated, or faster than anticipated, degradation of the battery 102. Accordingly, at block 506, the method 500 can determine whether one or more changes in aging patterns have occurred. Such a determination at block 506 can be based, at least in part, on the monitored aging stress factors from block 504.

If no change in aging patterns is determined to have occurred, the method 500 can continue with monitoring one or more aging stress factors at block 504. However, if a determination is made at block 506 that there is/are one or more changes in aging patterns, then at block 508 the method 500 can proceed with calculating an updated estimated anticipated battery degradation using information regarding the change in aging pattern. Such a recalculation can involve the method 200 of FIG. 2, including a determination of an equivalent previous aging time, this is similar, if not the same, as the equivalent previous aging time determination discussed above with respect to block 206 of FIG. 2. Further, similar to block 208 of FIG. 2, the equivalent previous aging time determined at block 206/508 can, at block 510, be used with the aging model to calculate an updated estimated accumulated total aging pattern that accounts for the aging pattern change that was detected at block 506.

At block 512, the updated estimated accumulated total aging pattern from block 510 can be compared with the estimated anticipated battery degradation that was determined at block 502. Such a comparison can involve determining a difference between the estimated accumulated total aging pattern and the estimated anticipated battery degradation, which can reflect the extent that the change in aging pattern that was detected at block 506 will, or is anticipated, to have on aging or degradation of the battery 102.

At block 514, a determination can be made as to whether the comparison from block 512 between the updated estimated accumulated total aging that was determined at step 510 and the estimated anticipated battery degradation that was determined at block 502 satisfies a predetermined threshold. Such a threshold can relate to the extent and/or degree that the updated estimated accumulated total aging exceeds the accumulated total aging estimate from block 502. Moreover, the determination at block 514 can provide an indication of whether the change in aging pattern that was detected at block 506 is of the variety, or has enough significance, that resulting anticipated battery degradation could exceed acceptable levels. Knowledge of the extent or degree of a change in the estimated battery degradation, as indicated by the result of block 514, can assist an operator in determining if remedial efforts should be undertaken, such as, for example, changes in an ambient temperature, so as to minimize or otherwise remediate the impact the change that was detected at 506 is estimated to have on battery degradation. Additionally, or alternatively, the determination at block 512 can be use in connection with providing an indication of a potentially unknown change in aging pattern that may need to be addressed and/or corrected. Conversely, if the determination at block 514 is that the differences between the updated estimated accumulated total aging from block 510 and the estimated anticipated battery degradation from block 502 does not satisfy the predetermined threshold, then the impact of the detected aging pattern change may be relatively minor, and no further actions may be warranted at that time to counter the detected change in aging pattern.

Accordingly, if at block 514 a determination is made that the updated estimated accumulated total aging does satisfy such threshold(s), at block 516 an operator can be alerted of a change in the estimated anticipated battery degradation and/or the detected change in the aging pattern. Such an alert can be communicated to the operator in a variety of different manners, including, for example, via a visual and/or audible alert that can be communicated through the output device 126, including, for example, via the display 132 and/or the alarm 134. The operator may, in response to such an alert, evaluate conditions that may cause such a change in the estimated anticipated battery degradation, including, for example, the change detected at block 506. If however, at block 514, the updated estimated accumulated total aging is determined to not satisfy the threshold, then the method 500 can continue with monitoring one or more aging stress factors at block 504.

Figure 6:
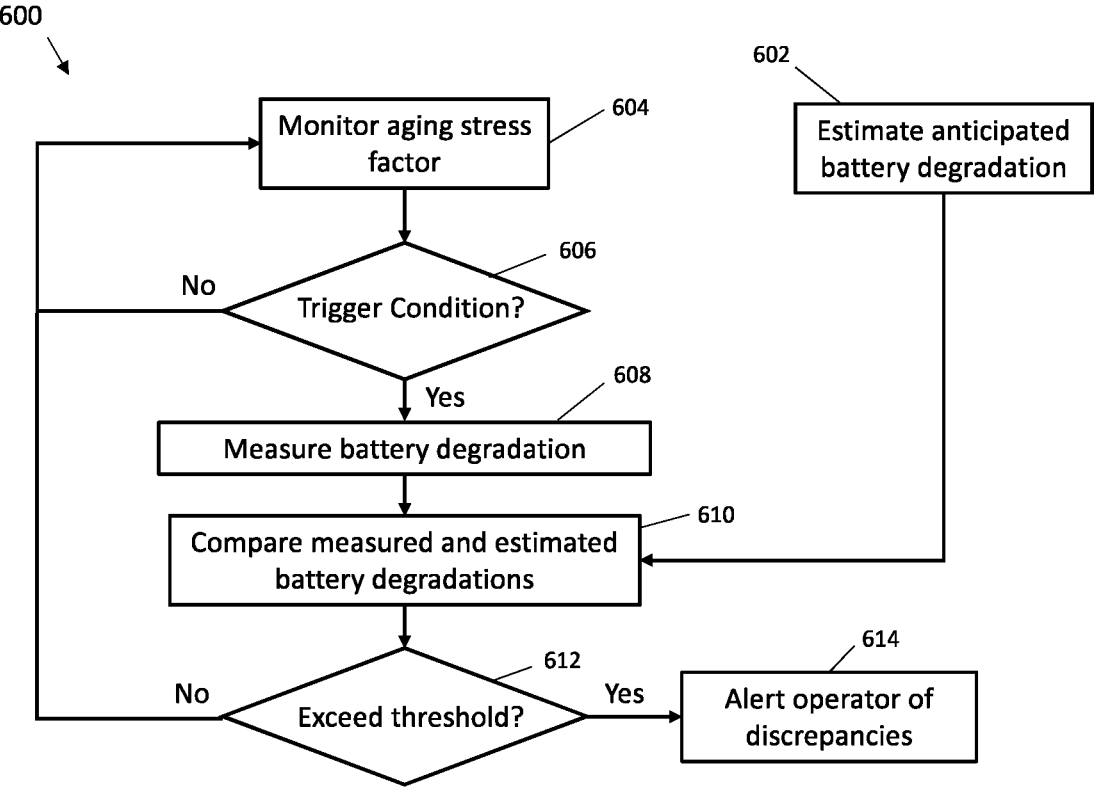
FIG. 6 is a simplified flowchart of a method for detecting, in response to a trigger condition, a discrepancy between an estimated and measured accumulated total aging of a battery that can be performed by at least the system diagrammatically depicted in FIG. 1.

FIG. 6 is a simplified flowchart of a method 600 that can be performed by the aging estimation computing device 124 of the control system 104, and that can incorporate the method 200 for estimating accumulated total battery degradation. The method 600 corresponds to, or is otherwise associated with, performance of the blocks described below in the illustrative sequence of FIG. 6. It should be appreciated, however, that the method 600 can be performed in one or more sequences different from the illustrative sequence.

At block 602, the estimated anticipated battery degradation can be determined. Such a determination can involve the method 200 discussed above with respect to FIG. 2. Thus, according to certain embodiments, the estimated anticipated battery degradation at block 602 can be the final accumulated total degradation that was determined at block 212 in FIG. 2. Additionally, the estimated anticipated battery degradation from block 602 and/or the final accumulated total degradation that was determined at block 212 can be stored by the control system 104, including, for example in the memory 108 and/or a data storage unit 118.

Additionally, at block 604, one or more aging stress factors can be monitored. Such monitoring can occur in a variety of a different manners, including, for example, by use of the stress sensor 116, battery sensor 114, and/or BMS 112. Further, the monitored aging stress factor can correspond to a sensed or measured value, or can be the result of a calculation. For example, according to start embodiments, the monitored stress aging factor can be the temperature of the ambient environment in which the battery 102 is located, as detected via use of the stress sensor 116.

As previously discussed with respect to method 200 of FIG. 2 and block 506 of FIG. 5, the final accumulated total degradation that was determined at block 212 can be used for the estimated anticipated battery degradation for block 602. Again, such an estimation can be based, for example, on anticipated aging patterns, including, for example, anticipated ambient temperatures and/or temperature ranges. However, during actual use, the battery 102 can experience one or more deviations from such anticipated aging patterns, or experience other trigger conditions, that can cause greater, or faster, than anticipated aging of the battery 102.

Accordingly, at block 606, the method 600 can include determining whether one or more trigger conditions have occurred, including, for example, changes in an aging pattern and/or deviations from an anticipated time of an aging pattern(s). The trigger condition can take a variety of different forms. For example, in certain situations, the trigger condition can relate to a battery 102 experiencing an unexpected load level, and/or delivering power for a relatively excessive period of time. Further, such a determination at block 606 can be based on the monitored aging stress factors from block 604, and/or information provided by the timer or clock 120. If a trigger condition is determined to not have occurred, the method 600 can continue with monitoring aging stress factors at block 604.

However, if a determination is made at block 606 of the occurrence of a trigger condition, then at block 608 measurements can be obtained that can be used in determining actual degradation, or aging, of the battery 102. For example, as previously discussed, if the estimated anticipated battery degradation determined for block 602 relates to capacity fade, then at block 608 a capacity test can be performed. For example, a capacity test can be performed via use of the BMS 112 wherein energy is drawn from the battery 102 for a period of time to determine an ampere hour rating for the battery 102. Information from such measurements, or associated calculations, can be correlated to the estimated anticipated battery degradation from block 602 so that a comparison can be made at block 610 between the estimated and measured battery degradations.

If the comparison from block 610 indicates that the differences between the estimated and measured battery degradations exceed a threshold value(s), as determined at block 612, the operator can be alerted of such discrepancies at block 614. Moreover, such discrepancies can indicate a change in conditions, or other activities, that may be detrimental to the longevity of the battery 102, and which the operator may seek to remedy and/or investigate. Such an alert can be communicated to the operator in a variety of different manners, including, for example, via a visual and/or audible alert that can be communicated through the output device 126, including, for example, the display 132 and/or the alarm 134.

If however at block 612 the differences between the estimated and measured total aging of the battery 102 is determined to not satisfy the threshold, then the method 600 can continue monitoring aging stress factors at block 604.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A computer implemented method for estimating an accumulated total aging of a battery, the method comprising:
  receiving, by one or more processors of a control system, a first aging pattern for the battery and a first aging time;
  determining, by the one or more processors of the control system applying the first aging pattern and the first aging time to an aging model, a first battery aging estimation, the aging model being stored in a memory of the control system;
  receiving, by the one or more processors of the control system, a second aging pattern for the battery and a second aging time, the second aging pattern being different than the first aging pattern and occurs subsequent to the first aging pattern;
  determining, by the one or more processors of the control system using the aging model, the first battery aging estimation, and the second aging pattern, an equivalent previous aging time, the equivalent previous aging time providing an adjusted value for the second aging pattern, the adjusted value corresponding to the aging model attaining, under the second aging pattern, the first battery aging estimation;
  adjusting, by the one or more processors of the control system, the second aging time to account for the equivalent previous aging time;
  determining, by the one or more processors of the control system applying the second aging pattern and the adjusted second aging time to the aging model, a battery accumulated aging estimation, the battery accumulated aging estimation indicating an estimated degradation of the battery over a combined duration of the first and second aging patterns;
  updating, in a memory of the control system, an accumulated total battery aging estimation that is based at least in part on the determined battery accumulated aging estimation; and
  adjusting, based on the accumulated total battery aging estimation, at least one of a state of charge, a temperature, a battery charging and/or discharging range, and a battery charging and/or discharging rate, to extend a longevity or improve a condition of the battery.

2. The method of claim 1, wherein the first and second aging patterns each include an aging stress factor comprising at least one of a state of charge for the battery, a temperature, a battery charging and/or discharging range, and a battery charging and/or discharging rate.

3. The method of claim 1, wherein the first aging pattern and the second aging pattern are each a predicted aging pattern that is based on one or more historical conditions.

4. The method of claim 3, wherein the one or more historical conditions comprises at least one of a temperature at a selected geographic location, a temperature during a calendar season, a temperature during transportation of the battery, and a temperature at a storage facility for the battery.

5. The method of claim 1, wherein the first aging pattern is based on measured data that is obtained during operation of the battery during the first aging pattern, and wherein the second aging pattern is based on measured data that is obtained during operation of the battery during the second aging pattern.

6. The method of claim 1, further including:
  measuring at least one of the first aging stress factor and the second aging stress factor by a stress factor sensor, the stress factor sensor being communicatively coupled to the at least one processor; and
  receiving, by the control system, a transmitted signal corresponding to the measurement of the first aging stress factor and/or the second aging stress factor.

7. The method of claim 1, further including receiving, by the control system, a third aging pattern for the battery and a third aging time, the third aging pattern being different than the second aging pattern and occurs subsequent to the second aging pattern;
  determining, by the control system using the aging model, the battery accumulated aging estimation, and the third aging pattern, an updated equivalent previous aging time, the updated equivalent previous aging time providing an adjusted value for the third aging pattern, the adjusted value corresponding to the aging model attaining, under the third aging pattern, the battery accumulated aging estimation;
  adjusting, by the control system, the third aging time to account for the updated equivalent previous aging time; and
  determining, by the control system applying the third aging pattern and the adjusted third aging time to the aging model, an updated battery accumulated aging estimation, the updated battery accumulated aging estimation indicating an estimated degradation of the battery over a combined time of the first, second, and third aging patterns.

8. The method of claim 1, further comprising:

measuring one or more properties of the battery;

determining, by a controller or a battery management system of the control system, and using the measurement of the one or more properties of the battery, an aging condition of the battery;

comparing the determined aging condition with the accumulated total battery aging estimation; and transmitting, in response to an outcome of the comparison of the determined aging condition and the accumulated total battery aging estimation, an alert via the output device that is communicatively coupled to the control system.

9. The method of claim 8, further including adjusting the first aging pattern or the second aging pattern in response to the outcome of the comparison of the determined aging condition and the accumulated total battery aging estimation.

10. The method of claim 1, further including:

monitoring, by a stress sensor that is communicatively coupled to the control system, at least one of the first aging stress factor and the second aging stress factor;

detecting, from the monitoring, a change in at least one of the first aging stress factor and the second aging stress factor;

measuring, in response to detection of the change, one or more properties of the battery;

comparing information obtained using the measurement of the one or more properties to a threshold value; and transmitting, in response to an outcome of the comparison, an alert via the output device that is communicatively coupled to the control system.

11. The method of claim 10, further including adjusting the first aging pattern or the second aging pattern in response to the outcome of the comparison.

12. A method for estimating an accumulated total aging of a battery, the method comprising:

(a) receiving, by one or more processors of a control system having at least one processor, an aging pattern and an aging time, the aging pattern including an aging stress factor comprising at least one of a state of charge for the battery, a temperature, a battery charging and/or discharging range, and a battery charging and/or discharging rate;

(b) determining, by the one or more processors of the control system and using the aging pattern, the aging time, and an aging model, a battery aging estimation;

(c) receiving, by the one or more processors of the control system, a next aging pattern and a next aging time, the next aging pattern being after, and different than, the aging pattern;

(d) determining, by the one or more processors of the control system, and using the aging model, the battery aging estimation, and the next aging pattern, an equivalent previous aging time, the equivalent previous aging time providing an adjusted value for the next aging pattern, the adjusted value corresponding to the aging model attaining, under the next aging pattern, the battery aging estimation;

(e) adjusting, by the one or more processors of the control system, the next aging time to account for the equivalent previous aging time;

(f) determining, by the one or more processors of the control system applying the next aging pattern and the adjusted next aging time to the aging model, a battery accumulated aging estimation, the battery accumulated aging estimation indicating an estimated degradation of the battery over at least a combined duration of the aging pattern and the next aging pattern;

(g) determining, by the one or more processors of the control system, for a subsequent aging pattern, an updated equivalent previous aging time using the aging model, the subsequent aging pattern, and the battery accumulated aging estimation;

(h) adjusting, by the one or more processors of the control system, an aging time of the subsequent aging pattern to account for the updated equivalent previous aging time;

(i) determining, by the one or more processors of the control system applying the subsequent aging pattern and the adjusted subsequent aging time to the aging model, an updated battery accumulated aging estimation;

(j) repeating steps (g)-(i) for one or more additional subsequent aging patterns, wherein repeating step (g) the battery accumulated aging estimation is replaced by the updated battery accumulated aging estimation that was previously determination at step (i), and wherein upon the completion of step (i) for the last of the one or more additional subsequent aging patterns, the updated battery accumulated aging estimation is the accumulated total battery aging estimation;

(k) updating, in a memory of the control system, an accumulated total battery aging estimation that is based at least in part on the determined battery accumulated aging estimation; and (l) adjusting, based on the accumulated total battery aging estimation, at least one of a state of charge, a temperature, a battery charging and/or discharging range, and a battery charging and/or discharging rate, to extend a longevity or improve a condition of the battery.

13. The method of claim 12, wherein at least the aging pattern is a predicted aging pattern that is based on historical conditions comprising at least one of a temperature at a selected geographic location, a temperature during a calendar season, and a storage temperature for the battery.

14. The method of claim 12, further comprising:

measuring at least the aging stress factor by a stress factor sensor, the stress factor sensor being communicatively coupled to the at least one processor, and receiving, by the control system, a transmitted signal corresponding to the measurement of the aging stress factor.

15. The method of claim 12, further including monitoring, by a stress sensor that is communicatively coupled to a controller or battery management system of the control system, for a change in at least one of the aging pattern and the next aging pattern.

16. The method of claim 15, further including transmitting an alert to the output device in response to a change, as detected via the monitoring by the stress sensor, in at least one of the aging pattern and the next aging pattern.

17. A system for estimating an accumulated total aging of a battery, the system comprising:

an interface for presenting data for a first aging pattern and a second aging pattern, the second aging pattern being different than, and occurs at a time subsequent to, the first aging pattern; and an aging estimation computing device having at least one processor configured to:

determine, applying the first aging pattern and a corresponding first aging time to an aging model, a first battery aging estimation;

determine, using the aging model, the first battery aging estimation, and the second aging pattern, an equivalent previous aging time, the equivalent previous aging time providing an adjusted value for a second aging pattern, the adjusted value corresponding to the aging model attaining, under the second aging pattern, the first battery aging estimation;

modify the second aging time to account for the equivalent previous aging time;

determine, by applying the second aging pattern and the modified second aging time to the aging model, an accumulated total battery aging estimation, the accumulated total battery aging estimation indicating an estimated degradation of the battery over a combined duration of the first and second aging patterns;

update, in a memory of the control system, an accumulated total battery aging estimation that is based at least in part on the determined battery accumulated aging estimation; and adjusting, based on the accumulated total battery aging estimation, at least one of a state of charge, a temperature, a battery charging and/or discharging range, and a battery charging and/or discharging rate, to extend a longevity or improve a condition of the battery.

18. The system of claim 17, wherein the aging estimation computing device is further configured to:

(a) determine, using the aging model, a subsequent aging pattern, and the accumulated total battery aging esti-mation that was previously determined for a preceding aging pattern, an updated equivalent previous aging time;

(b) increase a subsequent aging time of the subsequent aging pattern to account for the updated equivalent previous aging time; and (c) determine, by applying the subsequent aging pattern and the subsequent aging time to the aging model, an updated value for the accumulated total battery aging estimation, the updated value for the accumulated total battery aging estimation indicating an estimated degradation of the battery from the first aging pattern to the subsequent aging pattern.

19. The system of claim 18, wherein the aging estimation computing device is further configured to repeat the determinations and modification of features (a)-(c) of claim 18 for each of one or more additional subsequent aging patterns, wherein repeating the determination of feature (a) the accumulated total battery aging estimation is replaced by the updated value for the accumulated total battery aging estimation that was previously determined at feature (c) under the prior subsequent aging pattern.

20. The system of claim 17, further including a battery management system configured to measure one or more properties of the battery, wherein the aging estimation computing device is further configured to compare the aging estimation computing device with information obtained from the measurement of the one or more properties, and wherein the aging estimation computing device is further configured to generate an alert in response to a result from the comparison of the aging estimation computing device with information obtained from the measurement of the one or more properties.

* * * * *